United States Patent
Vincenzi et al.

(10) Patent No.: US 7,790,818 B2
(45) Date of Patent: Sep. 7, 2010

(54) PROCESS FOR PREPARING CATALYST COMPONENTS FOR THE OLEFIN POLYMERIZATION

(75) Inventors: Paolo Vincenzi, Rovigo (IT); Rosa Spoto, Ferrara (IT)

(73) Assignee: Basell Polidlefine Italia s.r.l., Milan (IT)

( * ) Notice: Subject to any disclaimer, the term of this patent is extended or adjusted under 35 U.S.C. 154(b) by 740 days.

(21) Appl. No.: 11/629,274

(22) PCT Filed: Jun. 1, 2005

(86) PCT No.: PCT/EP2005/005966

§ 371 (c)(1),
(2), (4) Date: Dec. 12, 2006

(87) PCT Pub. No.: WO2005/123783

PCT Pub. Date: Dec. 29, 2005

(65) Prior Publication Data

US 2008/0194781 A1      Aug. 14, 2008

Related U.S. Application Data

(60) Provisional application No. 60/587,521, filed on Jul. 13, 2004.

(30) Foreign Application Priority Data

Jun. 18, 2004 (EP) .................. 04102802

(51) Int. Cl.
*C08F 4/50* (2006.01)
*C08F 2/06* (2006.01)

(52) U.S. Cl. ...................... 526/124.3; 526/88
(58) Field of Classification Search .............. 526/124.3, 526/88
See application file for complete search history.

(56) References Cited

U.S. PATENT DOCUMENTS

| 4,399,054 A | 8/1983 | Ferraris et al. |
| 5,204,303 A | 4/1993 | Korvenoja et al. |
| 5,607,655 A | 3/1997 | Martin et al. |

FOREIGN PATENT DOCUMENTS

| EP | 395083 | 10/1990 |
| EP | 553806 | 8/1993 |
| EP | 601525 | 6/1994 |
| EP | 728769 | 8/1996 |
| WO | 01/85803 | 11/2001 |
| WO | 02/051544 | 7/2002 |

OTHER PUBLICATIONS

J.R. Severn et al., <<MAO-free activation of metallocenes and other single-site catalysts for ethylene polymerization using supports based on MgC12,>>*Macromol. Rapid Commun.;Macromolecular Rapid Communications*, vol. 25, (10), pp. 1024-1028(2004).

*Primary Examiner*—Ling-Siu Choi
*Assistant Examiner*—Sonya Wright
(74) *Attorney, Agent, or Firm*—Jarrod N. Raphael

(57) ABSTRACT

Process for the preparation of a solid catalyst component for the polymerization of olefins, the process comprising the steps of: —continuously contacting solid particles of a $MgCl_2 \cdot mROH$ adduct, wherein $0.5<m<6.0$ and R is an alkyl, cicloalkyl or aryl radical having 1-12 carbon atoms, with a liquid phase comprising one or more compounds capable of reacting with the —OH groups of said adduct to obtain a slurry containing a $MgCl_2 \cdot nROH$, wherein n is lower than m; —reacting the slurry from step a) with one or more titanium compounds of formula $Ti(OR)_p X_{q-p}$, wherein $q=3-4$ and $p=0-q$, X is an halogen and R is an alkyl, cicloalkyl or aryl radical having 1-18 carbon atoms.

24 Claims, No Drawings

PROCESS FOR PREPARING CATALYST COMPONENTS FOR THE OLEFIN POLYMERIZATION

The present invention relates to a continuous process for preparing solid catalyst components for the polymerization of olefins and the catalysts obtainable therefrom. In particular, the process of the invention can be advantageously used to prepare with an improved yield supported catalysts for the olefin polymerization.

It is widely known in the art that catalytic components of the Ziegler/Natta type comprising a titanium compound supported on magnesium chloride in active form show a high activity in the polymerization of olefins. These catalytic components are indeed the most extensively used in the polymerization of olefins such as ethylene, propylene, etc.

Ziegler-Natta supported catalyst systems are generally obtained by contacting:

a solid catalytic component obtained by reacting a titanium compound comprising at least a titanium-halogen bond with a solid support comprising a magnesium halide; and an aluminum organometallic compound as a catalyst activator.

When a catalyst is prepared for the stereospecific polymerization of propylene or higher α-olefins, an electron donor (internal donor) is advantageously used in the preparation of the solid catalytic component. In this case, an additional donor (external donor) is generally added in the step of contacting the solid catalytic component with the aluminum alkyl compound.

Suitable solid catalytic components can be obtained by reacting $TiCl_4$ with a support comprising a magnesium compound that can be a magnesium dihalide, such as $MgCl_2$, or an alcoholate or haloalcoholates of magnesium, such as ethoxymagnesiumchloride or diethoxymagnesium.

Particularly preferred supports are obtained from adducts of $MgCl_2$ with aliphatic alcohols, such as methanol, ethanol, propanol in the form of spherical particles. These adducts can be prepared by many different techniques. Some of these comprise the formation of a molten adduct of magnesium chloride and an aliphatic alcohol, followed by spraying in an atmosphere at low temperature (spray-cooling), so as to solidify the adduct.

Another method widely used in the preparation of spherical adducts comprising $MgCl_2$ consists in melting the above described adduct and stirring the molten adduct in a liquid medium in which said adduct is immiscible. The mixture is then transferred into a cooling bath containing a liquid at a low temperature, in which the adduct is insoluble, which is capable of bringing about rapid solidification of the adduct in the form of spheroidal particles.

The above techniques can lead to the formation of adducts $MgCl_2$-aliphatic alcohol having a content of alcohol, generally in the range from 2.5 to 6.0 moles per mole of $MgCl_2$. Said particles are thereafter caused to react with an excess of $TiCl_4$ in order to ensure an effective titanation of the support and the consequent formation of the solid catalytic component. However, under certain polymerisation conditions, the so obtained catalytic components show an inadequate morphological stability and a poor mechanical resistance. These defects can be overcome by subjecting the adduct particles to a dealcoholation step, prior to the titanation step. Such a dealcoholation step reduces the alcohol content and improves the morphological stability of the particles: it is generally carried out by means of a thermal treatment passing the $MgCl_2$-alcohol adduct through a nitrogen flow at temperatures in the range 50-150° C.

EP 395 083 describes Ziegler-Natta catalysts suitable for producing spherically shaped polymers endowed with satisfactory morphological properties, such as high bulk density, flowability and mechanical resistance. According to this patent, particles of a $MgCl_2$-alcohol adduct generally containing about 3 mols of alcohol per mol of $MgCl_2$ are subjected to a partial dealcoholation by subjecting them to a nitrogen flow at temperatures going from 50° C. to 130° C. The dealcoholating step is carried out until the alcohol content is not greater than 2 moles per $MgCl_2$ mole, preferably comprised between 0.2 and 1.5 moles. The partially dealcoholated adduct is obtained in the form of spherical particles with an average diameter between 10 and 350 μm, a surface area between 10 and 50 $m^2/g$ and a porosity from 0.6 to 2.0 $cm^3/g$. Said particles are thereafter caused to react with an excess of $TiCl_4$, optionally in the presence of an electron donor compound dissolved therein.

The use of physically dealcoholated supports as obtained by the disclosure of EP 395083 in the preparation of Linear Low Density Polyethylene (LLDPE) or HDPE and MDPE, gives polymerization processes with an unsatisfactory catalyst yield and polymers having a comonomer distribution which is not sufficiently uniform.

In other prior art processes, a chemical dealcoholation step is carried out by means of a chemical component: the adduct particles are contacted with compounds capable of reacting with the —OH groups of the adduct. Trialkylaluminum compounds are generally the preferred ones among the compounds capable of reacting with the —OH groups. Generally, said chemical treatment is carried out downstream the thermal treatment. In fact, being the reactivity of the $MgCl_2$-alcohol adduct towards the trialkylaluminum compounds directly correlated to the alcohol amount, in order to avoid the breakage of the adduct particles it is preferable to operate first the thermal treatment under the nitrogen flow and only successively to chemically treat the adduct.

As an example of this technique, EP 553 806 refers to solid catalyst components having a spherical shape, suitable to prepare Ziegler-Natta catalysts capable of giving ethylene copolymers endowed with a uniform comonomer distribution and having a high bulk density when obtained by polymerization in the gas phase. Adducts of formula $MgCl_2 \cdot qROH$, wherein $2.5 \leq q \leq 3.5$ and R is an alkyl, cicloalkyl or aryl radical having 1-12 carbon atoms, are prepared in spherical form starting from melted adducts, by emulsifying the adducts in a liquid hydrocarbon and thereafter causing them to solidify by fast quenching. The thus obtained spherulized adducts are then subjected to thermal dealcoholation under a nitrogen flow at temperatures comprised between 50 and 150° C. until the alcohol content is reduced to values lower than 2 mols per mol of magnesium dihalide.

Said adducts are then treated with chemical reagents capable of further dealcoholating the adduct until the alcohol content is reduced to values of less 0.5 mols per mol of magnesium dihalide. Accordingly, adducts of formula $MgCl_2 \cdot pROH$, wherein $p \leq 0.5$ are used as a catalyst precursor for the successive reaction with the titanium compound. As it can be understood from the working examples of this patent (e.g. Example 1), the step of chemically dealcoholating the $MgCl_2$·alcohol adduct is carried out in a batch reactor. Specifically, after the thermal treatment under a nitrogen flow, a suspension of the partially dealcoholated adduct in anhydrous hexane is charged into the reactor. Then a solution of $AlEt_3$ as a dealcoholating agent is slowly added to said reactor under stirring conditions. The temperature is raised to 60° C. and kept constant for 60 minutes: then stirring is discontinued and the particles of adduct are allowed to settle. The treatment with AlEt$_3$ is repeated two more times under the same conditions, followed by 3 washes with anhydrous hexane and drying at 50° C.

The above process involves many drawbacks. First, it generally requires long times due to several contacting steps with AlEt$_3$ followed by several washing steps. Moreover, the formation of by-products, such as aluminum alcoholates, coming from the reaction of the MgCl$_2$-alcohol adduct with AlEt$_3$, strongly limits the solids concentration under which a batch reactor can be operated: said concentration has to be kept at a low value (generally of less about 150 g/l) to prevent negative effects on the morphology of the catalyst support. In fact, high concentrations of solids for a prolonged time would imply a corrosive effect on the support particles, this corrosive effect being exerted by the reaction by-products. The negative effects involved by said low concentration of solids in the contacting step are: 1) a low productivity (kilograms of catalyst component/reactor volume per day) of the process and 2) the need of using reactors having a large volume.

Furthermore, in case of catalyst supports having a fine size (less than 50 µm), preferably used in a liquid-phase polymerisation process, the drawbacks involved by the process described in EP 553 806 are even worsened. In fact, the less is the average size of the adduct particles, the more is the time required for settling the particles after each contact step with AlEt$_3$, thus further increasing the overall process time and decreasing the productivity of the process.

In view of the above drawbacks, it was felt the need of preparing solid catalyst components for the olefin polymerization by means of a process capable of decreasing the overall process time and the reactor volumes, thus improving the process productivity.

It has been now found that by operating the dealcoholation step according to the process of the present invention, supported Ziegler-Natta catalysts are obtained with an increased productivity, at the same time overcoming the drawbacks involved by the process described in EP 553 806.

It is therefore an object of the present invention a process for the preparation of a solid catalyst component for the polymerization of olefins, the process comprising the steps of:
  a) continuously contacting solid particles of a MgCl$_2$.mROH adduct, wherein 0.5<m<6.0 and R is an alkyl, cicloalkyl or aryl radical having 1-12 carbon atoms, with a liquid phase comprising one or more compounds capable of reacting with the —OH groups of said adduct to obtain a slurry containing a MgCl$_2$.nROH, wherein n is lower than m;
  b) reacting the slurry from step a) with one or more titanium compounds of formula Ti(OR)$_p$X$_{q-p}$, wherein q=3-4 and p=0-q, X is an halogen and R is an alkyl, cicloalkyl or aryl radical having 1-18 carbon atoms.

The adduct of formula MgCl$_2$.mROH, which is fed to step a) as a solid support, has an average diameter in the range from 1.0 to 150 µm, preferably from 1.0 to 70 µm, more preferably from 3.0 to 40 µm. Catalyst supports of less than 40 µm are the preferred ones when the olefin (co)polymerization is carried out in a liquid phase: in fact, the reduced size of the catalyst particles favours their dispersion in the liquid medium of reaction. Different from the prior art processes, the process of the invention allows the preparation of these low particle-size catalyst components with a high productivity (kilograms of catalyst/reactor volume per day), being capable of increasing the concentration of solid particles reacting in steps a) and b). Moreover, the use of not physically dealcoholated supports in a polymerization process gives the further advantage of increasing the catalyst mileage maintaining a good morphological stability.

The solid support fed to step a) can be suitably prepared in spherical form by mixing alcohol and magnesium chloride in the presence of an inert hydrocarbon immiscible with the adduct, operating under stirring conditions at the melting temperature of the adduct. Then, the obtained emulsion is quickly quenched, thereby causing the solidification of the adduct in form of spherical particles. Examples of spherical adducts prepared according to this procedure are described in U.S. Pat. No. 4,399,054 and WO 98/44009. A preferred method to obtain the solidification of the adduct in form of spherical particles is described in the patent application WO 02/051544. Particularly preferred adducts to be used in step a) are MgCl$_2$/ethanol adducts having from 2 to 4 moles of ethanol.

According to the process of the invention, the dealcoholation step a) is carried out by feeding and withdrawing the liquid phase in a continuous mode. In particular, in step a) the liquid phase comprising said compounds capable of reacting with the —OH groups is continuously fed to a vessel containing the solid particles of the adduct. Optionally the liquid phase comprises a hydrocarbon solvent used as the liquid medium for dispersing the above reactants: the preferred ones are hexane, pentane and toluene.

Suitable compounds capable of reacting with the —OH groups of the adduct can be: halogenated silicon compounds, such as SiCl$_4$, halogenated Sn-compounds, such as SnCl$_4$, titanium compounds having at least a Ti-halogen bond, such TiCl$_4$, and aluminum-alkyl compounds. The last, in particular Al-trialkyl compounds, are the preferred ones. Triethyl-aluminum, tri-nbutyl-aluminum, tri-isobutyl-aluminum and chloro-diethyl-aluminum are more preferably used.

Step a) is generally carried out into a vessel endowed with a stirring device, as for example a mechanical stirrer. The stirrer gives the slurry a mixing action, which contributes to disperse the solid particles inside the liquid phase and to make uniform the solid concentration in the slurry.

In step a) the initial temperature of the liquid phase can be kept in a range from −10° C. to 50° C. and such temperature is then gradually raised up a value comprised between 40° C. and 150° C. in order to increase the kinetics of the reaction. The concentration of solid particles in the slurry generally ranges from 100 to 400 g/l, preferably from 150 to 300 g/l.

A liquid stream is continuously withdrawn from step a) to keep constant the level of liquid in the reactor. The average residence time of the liquid in the vessel (ratio between the liquid volume and the flow rate of liquid exiting the vessel) is preferably below 90 minutes, and it can be advantageously kept even under 30 minutes.

The liquid stream continuously withdrawn from step a) comprises, besides the solvents, also the unreacted dealcoholating agents and reaction by-products.

The discharge of said liquid stream from the vessel should be carried out avoiding the entrainment of the adduct particles: to this purpose, said liquid stream is continuously separated from the solid particles by means of appropriate separating techniques, particularly by filtration or centrifugation, preferably by filtration. Suitable separating elements are filtering units that are generally placed inside the vessel, but can also be placed outside the vessel.

According to a preferred embodiment, a slurry containing a MgCl$_2$.nROH adduct with a reduced alcohol content (n<m) is continuously separated from said liquid stream withdrawn from step a) by means of filtering units placed inside the vessel. In this case, the liquid stream comprising the solvent, the unreacted dealcoholating agents and the by-products passes through the filtration device and is continuously withdrawn from the vessel via an outlet placed downstream the filtering units.

After the time required for decreasing the value of m in formula $MgCl_2.mROH$ to the targeted value n, the slurry containing the dealcoholated adduct is discharged from the vessel by an outlet placed upstream the filtering units. Preferably, said targeted value n is comprised between 0.1 and 3.0.

Generally, before carrying out the slurry discharge, a washing step is adopted for purifying the obtained slurry from the presence of by-products and unreacted dealcoholating agents: the washing has the aim of preventing, in the successive step b), undesirable secondary reactions between the Titanium compounds and said by-products. The washing step can take place in continuous by feeding the solvent alone to the vessel and interrupting for a suitable time the feeding of the dealcoholating agent.

When aluminum alkyl compounds are used as dealcoholating agents, the by-products formed during step a) generally comprise aluminum alcoholates, aluminum chlorine-alcoholates, such as diethyl monoethoxy aluminum. In order to carry out the recover of the solvent, the discharged liquid stream is sent to a specific neutralization section, where said compounds are made harmless by means of reaction with water. Only after their neutralization, the solvent can be recovered by distillation and then continuously recycled to the reaction vessels.

The slurry obtained from step a) is successively subjected to step b), in which the dealcoholated particles are contacted with one or more titanium compounds of formula $Ti(OR)_p X_{q-p}$, wherein q=3-4 and p=0-q; X is an halogen, R is an alkyl, cicloalkyl or aryl radical having 1-18 carbon atoms. $TiCl_4$ and tetra-alkoxytitanium compounds are the preferred ones.

Optionally, also one or more compounds of formula $Si(OR)_p X_{4-p}$, wherein p=0-4, X is an halogen and R is an alkyl, cicloalkyl or aryl radical having 1-18 carbon atoms, can be fed to step b) in admixture with the above titanium compounds.

The titanation step b) can be carried out in a second vessel placed downstream the first vessel or, in alternative, in the same vessel of step a). In the latter case, the slurry of dealcoholated particles obtained from step a) is not discharged from the vessel and step b) is carried out replacing the feeding of the alkyl aluminum compounds with the feeding of a liquid phase containing one or more titanium compounds.

In step b) the initial temperature of the liquid phase containing the Ti compound can be from −10° C. to 50° C. Such a temperature is then gradually raised to a value to be kept in the range from 50° C. to 150° C. in order to ensure an effective titanation of the adduct particles. Preferably, the titanium compounds are fed in a continuous mode and a liquid stream is continuously withdrawn from step b) to keep constant the liquid level in the reactor.

An electron donor compound (internal donor) may be added to the reactive system before or during the contacting with the titanium compound. It can also be added along with the liquid containing the titanium compound. Electron donor compounds suitable for the preparation of the solid catalyst component can be selected from ethers, esters, ketones, amides, tertiary amines. Preferred electron donors are selected from succinates, diethers and mono- or di-alkyl esters of aromatic carboxylic acids, such as diisobutylphtalate or ethylbenzoate.

Also during step b) the discharge of the liquid stream from the vessel should be carried out by avoiding the entrainment of the solid particles: to this purpose, the solid particles obtained from step b) are separated from the liquid phase by means of filtration or centrifugation, preferably by filtration. The filtering units are preferably placed inside the vessel, but can be also placed outside the vessel.

According to a preferred embodiment, the filtering units are placed inside the vessel at the bottom part thereof: as a consequence, a liquid stream comprising the solvent, the unreacted Titanium compounds and the reaction by-products passes through the filtration device, before to be discharged from the vessel via an outlet placed downstream the filtering units. Similarly to step a), the slurry containing the solid catalyst components is discharged from the vessel by means of an outlet placed upstream the filtration device.

Also in step b) a washing step can be carried out for purifying the obtained slurry from the presence of by-products and unreacted titanium compounds. The washing can take place in continuous by feeding the solvent alone to the vessel.

Both steps a) and b) of the present invention can be carried out into vessels containing one or more filtering units, the openings of said filtering units depending on the size of the solid particles and being comprised between 1 to 200 µm, the differential pressure applied on the filtering units ranging from 50 to 1000 Kpa. Examples of a similar apparatus are the Nutsche filters (e.g. the Rosenmund type), which consist of a vessel with a perforated or porous bottom, which may either support a filter medium or act as the filter medium. The filter medium can be a filter cloth, a sintered plate, a porous ceramic structure, a wire screen, or a perforated plate.

Alternatively, the process of the invention can be carried out into vessels containing one or more filtering units having a cylindrical shape, said filtering units being concentrically placed all around the central axes of the vessel. Also centrifugal-discharge filters can be used, such as a Funda filter: they consist of a vessel that coassially contains an assembly of horizontal filter plates mounted on a hollow motor-connected shaft. After a suitable filtration time, the rotation of the shaft allows a discharge of the solid deposited onto the filter plates.

According to another embodiment, the process of the invention can take place in a sequence of two rotating drums: after the occurring of the reactions of step a) and b) respectively in the first and second drum, the slurry containing the solid particles is separated from the liquid phase by centrifugation. The rotation velocity of the drum must be sufficient to concentrate the solid particles at the walls of the drum, while a liquid phase devoid of solid particles can be withdrawn from the central portion of the drum.

Before the feeding to step a) the solid particles of $MgCl_2$-alcohol adduct may be optionally subjected to a short thermal treatment by passing them through a nitrogen flow at temperatures in the range 50-150° C. to obtain a partial reduction of the alcohol content.

Solid catalyst components having an average diameter in the range from 1.0 to 150 µm can be obtained by the above described process of the invention. They are generally used after contacting them with a catalyst activator, generally selected from aluminum organometallic compounds, such as a trialkyl-aluminum or an aluminum-alkyl-hydride. A commonly used activator is triethyl-aluminum.

Particularly when stereospecific polymers are produced, an electron donor (external donor) is contacted with the solid catalyst component before the polymerisation. The external donor compound may be the same or different from the internal donor. Preferred compounds are silicon compounds containing at least one Si—OR bond (R being a hydrocarbon radical).

The catalysts obtainable from the solid catalyst components prepared with the process of the present invention are particularly suitable to homo- or co-polymerise α-olefins of formula $CH_2=CHR$, wherein R is hydrogen or an alkyl, cycloalkyl, aryl, arylalkyl or alkylaryl radical with 1 to 12 carbon atoms.

As mentioned above, the catalysts obtained by the process of the invention are particularly suitable for the use in slurry or solution polymerisation processes for the production of ethylene polymers, such as high density polyethylene (HDPE) or linear low density polyethylene (LLDPE).

The following examples will further illustrate the present invention without limiting its scope.

EXAMPLES

Characterization

P50 is the value of the diameter such that 50% of the total particles have a diameter lower than that value: P50 gives a measure of the average diameter of the particles.
The poured bulk density of the obtained polymer particles is measured according to ASTM D1895/69;
MIE flow index is measured according to ASTM-D 1238
MIF flow index is measured according to ASTM-D 1238
Preparation of the Adduct
An adduct of formula $MgCl_2.3.0C_2H_5OH$ in the form of spherical solid particles was prepared following the procedure described in Example 1 of EP 728 769, from page 12, line 55 to page 13, line 11.
Preparation of the Solid Catalytic Component Example 1

Step a) of the process of the invention was carried out in a jacketed 1 m³ reactor provided with a mechanical stirrer and a filtering device placed inside the reactor at the bottom part thereof.

An adduct of formula $MgCl_2.3.0C_2H_5OH$ having a low particle size (P50=15 microns) was treated in this example.

180 Kg of the above adduct, in suspension with 800 l of anhydrous hexane, were loaded to the reactor: concentration of solid in the slurry of about 225 g/l.

At 0° C. a liquid phase containing 200 Kg of triethylaluminium diluted in anhydrous hexane was continuously fed to the reactor, keeping constant the feeding flow rate. Simultaneously, the same flow rate of liquid was withdrawn in continuous from the reactor, to keep constant the liquid level in the reactor and the average residence time of the liquid in the reactor (ratio between liquid volume and liquid flow rate) was set at 60 min.

The solid was suspended by operating the stirrer at an adequate speed to obtain a homogeneous suspension and to minimise resistance to the transfer of material and heat. The internal temperature of the reactor was gradually raised from 0° C. to 50° C. at a constant rate of temperature increase.

The liquid stream discharged from the reactor was composed of hexane, unreacted triethylaluminum, and the reaction by-products. Said liquid stream was able to pass through the filtration device and was continuously withdrawn from the vessel via an outlet placed downstream the filtering units, so that no solid particles were discharged therewith.

After the above amount of triethylaluminium was fed into the reactor and a value of n=0.5 in formula $MgCl_2.nC_2H_5OH$ was achieved, the slurry containing the dealcoholated adduct particles was subjected to a washing step for purifying it from the presence of by-products and unreacted alkyl-aluminum compounds. The washing step was carried out by feeding and discharging in continuous hexane from the reactor without any feed of triethyl-aluminum.

Afterwards the slurry containing support particles of formula $MgCl_2.0.5C_2H_5OH$ was subjected to the titanation step b) according to the present invention.

Step b) was carried out feeding a liquid phase containing tetrabutoxytitanium and $TiCl_4$ to the same reactor of step a). Said liquid phase was prepared in a stirred vessel of 0.3 m³, in which 72 kg of tetrabutoxytitanium were mixed with 35 kg of $TiCl_4$ at room temperature, in the presence of hexane as a diluent.

This liquid phase was gradually loaded in 1 hour to the 1 m³ reactor of step a) to cause the reaction of the titanium compounds with the dealcoholated adduct particles. The reaction temperature was maintained constant at 60° C. for 1 hour to achieve an effective titanation of the adduct particles. Then the liquid phase was withdrawn from the vessel via an outlet placed downstream the filtering units, so that no solid particles were discharged therewith.

Thereafter the obtained solid was washed with a continuous feed of anhydrous hexane with constant level control at room temperature, and then vacuum dried at 40° C. The overall productivity of the process was of 240 kg/m³·day of solid catalytic component.

Example 2

An adduct of formula $MgCl_2.3.0C_2H_5OH$ having a low particle size (P50=13.5 microns) was treated in this example.

Before carrying out step a) of the present invention, solid particles of the above adduct were subjected to a thermal treatment, under nitrogen flow, at a temperature gradually increasing from 50° C. to 150° C., until spherical particles having a residual alcohol content corresponding to formula $MgCl_2.2.1C_2H_5OH$) were obtained.

Step a) of the process of the invention was carried out in the same jacketed 1 m³ reactor of example 1, to which 180 Kg of adduct $MgCl_2.2.1C_2H_5OH$, in suspension with 800 l of anhydrous hexane, were loaded: concentration of solid in the slurry of about 225 g/l.

At 20° C. a liquid phase containing 300 Kg of triethylaluminium diluted in anhydrous hexane was continuously fed to the reactor, keeping constant the feeding flow rate.

Simultaneously, the same flow rate of liquid was withdrawn in continuous from the reactor, to keep constant the liquid level in the reactor and the average residence time of the liquid in the reactor was set at 60 min.

The solid was suspended by operating the stirrer at an adequate speed to obtain a homogeneous suspension and to minimise resistance to the transfer of material and heat.

The internal temperature of the reactor was gradually raised from 20° C. to 50° C. at a constant rate of temperature increase.

The liquid stream discharged from the reactor was composed of hexane, unreacted triethylaluminum, and the reaction by-products. Said liquid stream was able to pass through the filtration device and was continuously withdrawn from the vessel via an outlet placed downstream the filtering units, so that no solid particles were discharged therewith.

After the above amount of triethylaluminium was fed into the reactor and a value of n=0.15 in formula $MgCl_2.nC_2H_5OH$ was achieved, the slurry containing the dealcoholated adduct particles was subjected to a washing step for purifying the obtained slurry from the presence of by-products and unreacted alkyl-aluminum compounds. The washing step was carried out by feeding and discharging in continuous hexane from the reactor without any feed of tri-ethyl-aluminum.

Afterwards the slurry containing support particles of formula $MgCl_2.0.15C_2H_5OH$ was subjected to the titanation step b) according to the present invention.

Step b) was carried out feeding a liquid phase containing tetrabutoxytitanium and $SiCl_4$ to the same reactor of step a). Said liquid phase was prepared in a stirred vessel of 0.3 m$^3$, in which 84 kg of tetrabutoxytitanium were mixed with 62 kg of $SiCl_4$ at 20° C. temperature, in the presence of hexane as a diluent.

This liquid phase was gradually loaded in 1 hour to the 1 m$^3$ reactor of step a) to allow the reaction with the solid previously treated with $AlEt_3$. The reaction temperature was maintained constant at 60° C. for 1 hour to achieve an effective titanation of the adduct particles. Then the liquid phase was withdrawn from the vessel via an outlet placed downstream the filtering units, so that no solid particles were discharged therewith.

Thereafter the solid was washed with a continuous feed of anhydrous hexane with constant level control at room temperature, and then vacuum dried at 40° C. The overall productivity of the process was of 300 km$^3$·day of solid catalytic component.

Example 3

Comparative

The same low particle size adduct $MgCl_2.3.0C_2H_5OH$ of Example 2 was used.

Solid particles of the above adduct were subjected to thermal treatment, under nitrogen flow, at a temperature gradually increasing from 50° C. to 150° C., until spherical particles corresponding to formula $MgCl_2.2.1C_2H_5OH$ were obtained.

180 Kg of adduct $MgCl_2.2.1C_2H_5OH$, in suspension with 2700 l of anhydrous hexane were fed to a jacketed 7 m$^3$ reactor provided with a mechanical stirrer: concentration of solid in the slurry of about 66 g/l.

The solid was suspended by operating the stirrer at an adequate speed to obtain a homogeneous suspension. At 20° C. 100 kg of $AlEt_3$ in solution in hexane were slowly added to the reactor. The temperature was then raised to 50° C. and kept constant for 60 minutes.

Stirring was stopped, settling was allowed to occur and the liquid phase was partially removed.

The treatment of the solid particles with $AlEt_3$ was repeated two more times under the same above described conditions, so that the total amount of dealcoholating agent fed into the reactor was equal to 300 Kg. After each treatment with $AlEt_3$ the solid particles were subjected to washing with anhydrous hexane at room temperature to remove the reaction by-products. The dealcoholated adduct particles showed a residual alcohol content of about 0.15 moles per mole of $MgCl_2$.

A liquid phase was prepared in a stirred vessel of 0.3 m$^3$, in which 84 kg of Tetrabutoxytitanium were mixed with 62 kg of $SiCl_4$ at room temperature, in the presence of hexane as a diluent. Said liquid phase was loaded to the jacketed 7 m$^3$ reactor to allow the reaction with the solid previously treated with $AlEt_3$.

The reaction temperature was maintained constant at 60° C. for 3 hours, then the liquid phase was separated by settling and siphoning.

Thereafter the solid was washed seven consecutive times using anhydrous hexane each time, at room temperature, and then vacuum dried at 40° C.

The overall productivity of the process was of about 10 kg/m$^3$·day of solid catalytic component.

As shown in Table 1 the operative conditions adopted in the process of invention (Examples 1 and 2) allow to achieve a considerable increase of the solid concentration in the slurry and, above all, the productivity of the solid catalytic component is considerably increased with respect to the prior art technique used in the comparative example 3.

Example 4

An adduct of formula $MgCl_2.3.0C_2H_5OH$ having a high particle size (P50=63 microns) was treated in this example.

Step a) of the process of the invention was carried out in a jacketed 1 m$^3$ reactor provided with a mechanical stirrer and a filtering device placed inside the reactor at the bottom part thereof.

130 Kg of the above adduct, in suspension with 800 l of anhydrous hexane, were loaded to the reactor: concentration of solid in the slurry of about 160 g/l.

At 0° C. a liquid phase containing 140 Kg of triethylaluminium diluted in anhydrous hexane was continuously fed to the reactor, keeping constant the feeding flow rate.

Simultaneously, the same flow rate of liquid was withdrawn in continues from the reactor, to keep constant the liquid level in the reactor and the average residence time of the liquid in the reactor (ratio between liquid volume and liquid flow rate) was set at 90 min.

The solid was suspended by operating the stirrer at an adequate speed to obtain a homogeneous suspension and to minimise resistance to the transfer of material and heat.

The internal temperature of the reactor was gradually raised from 0° C. to 50° C. at a constant rate of temperature increase.

The liquid stream discharged from the reactor was composed of hexane, unreacted triethylaluminum, and the reaction by-products. Said liquid stream was able to pass through the filtration device and was continuously withdrawn from the vessel via an outlet placed downstream the filtering units, so that no solid particles were discharged therewith.

After the above amount of triethylaluminium was fed into the reactor and a value of n=0.5 in formula $MgCl_2.nC_2H_5OH$ was achieved, the slurry containing the dealcoholated adduct particles was subjected to a washing step for purifying it from the presence of by-products and unreacted alkyl-aluminum compounds. The washing step was carried out by feeding and discharging in continuous hexane from the reactor without any feed of triethyl-aluminum.

Afterwards the slurry containing support particles of formula $MgCl_2.0.5C_2H_5OH$ was subjected to the titanation step b) according to the present invention.

Step b) was carried out feeding a liquid phase containing tetrabutoxytitanium and $TiCl_4$ to the same reactor of step a). Said liquid phase was prepared in a stirred vessel of 0.3 m$^3$, in which 72 kg of tetrabutoxytitanium were mixed with 35 kg of $TiCl_4$ at room temperature, in the presence of hexane as a diluent.

This liquid phase was gradually loaded in 1 hour to the 1 m$^3$ reactor of step a) to cause the reaction of the titanium compounds with the dealcoholated adduct particles. The reaction temperature was maintained constant at 60° C. for 1 hour to achieve an effective titanation of the adduct particles. Then the liquid phase was withdrawn from the vessel via an outlet placed downstream the filtering units, so that no solid particles were discharged therewith.

Thereafter the obtained solid was washed with a continuous feed of anhydrous hexane with constant level control at room temperature, and then vacuum dried at 40° C. The overall productivity of the process was of 130 kg/m$^3$·day of solid catalytic component.

Example 5

Comparative

The same high particle size adduct $MgCl_2.3.0C_2H_5OH$ of Example 4 was used.

130 Kg of the above adduct, in suspension with 2000 l of anhydrous hexane were fed to a jacketed 7 m$^3$ reactor provided with a mechanical stirrer: concentration of solid in the slurry of about 65 g/l.

The solid was suspended by operating the stirrer at an adequate speed to obtain a homogeneous suspension. At 20° C. 80 kg of AlEt$_3$ in solution in hexane were slowly added to the reactor. The temperature was then raised to 50° C. and kept constant for 120 minutes.

Stirring was stopped, settling was allowed to occur and the liquid phase was partially removed.

The treatment of the solid particles with AlEt$_3$ was repeated two more times under the same above described conditions, so that the total amount of dealcoholating agent fed into the reactor was equal to 240 Kg. After each treatment with AlEt$_3$ the solid particles were subjected to washing with anhydrous hexane at room temperature to remove the reaction by-products.

The dealcoholated adduct particles showed a residual alcohol content of about 0.5 moles per mole of MgCl$_2$.

However, the obtained particles was observed to be characterized by superficial breaks and fragmentation, so that the successive treatment with a Ti compound was not performed, since similar structural defects generally lead to solid catalyst components giving unacceptable morphological properties in the polymer.

The operative conditions adopted in the process of invention (Example 4) allow to achieve successful results in term of morphology and productivity of the solid catalytic component, even if adducts with a high particle size are treated. On the contrary, the prior art dealcoholation technique of the comparative example 5 fails in giving dealcoholated adduct particles suitable to be industrially exploited.

Polymerization Test

Ethylene Polymerization with the Catalyst Components of Examples 1-4

Four polymerization runs were carried out in the presence of the solid catalytic components prepared in Examples 1-4.

A 4 liters steel autoclave was loaded with 900 cm$^3$ of hexane containing 0.45 g of AlEt$_3$, as a catalyst activator, and with an amount of 0.01 g of solid catalyst component suspended in 100 cm$^3$ of hexane.

Stirring was initiated, the temperature was raised to 75° C., and then 3 bars of H$_2$ and 7 bars of ethylene were fed. The polymerization run lasted 3 hours, during which time the ethylene pressure was kept constant. After 3 hours the reaction was stopped by instantaneously venting off ethylene and H$_2$: 270 g of polymer were obtained, the properties of which are shown in Table 2.

TABLE 1

|  | Example 1 | Example 2 | Example 3 Comp. | Example 4 | Example 5 Comp. |
|---|---|---|---|---|---|
| Solid concentration in step a) [g/l] | 225 | 225 | 66 | 160 | 65 |
| Residence time of liquid (step a) [min] | 60 | 60 | — | 90 | 120 |
| Productivity [kg/m$^3$ · day] | 240 | 300 | 10 | 130 | — |
| P50 catalytic component [μm] | 14.5 | 12.4 | 12.5 | 61.8 | 62 |

TABLE 2

|  | Example 1 | Example 2 | Example 3 (Comp.) | Example 4 |
|---|---|---|---|---|
| MIE [dg/min] | 1.7 | 1.3 | 1.2 | 0.58 |
| MIF/MIE | 29.0 | 27.0 | 30.0 | 27.6 |
| Poured Bulk Density [g/cm$^3$] | 0.375 | 0.361 | 0.355 | 0.32 |
| Average particle size [μm] | 539 | 416 | 426 | 1641 |
| Mileage [kg$_{polymer}$/g$_{catalyst}$] | 31.4 | 19.7 | 19.6 | 10 |

The invention claimed is:

1. A process for preparing a solid catalyst component for polymerizing at least one olefin, the process comprising:
   continuously feeding to a vessel containing solid particles of a MgCl$_2$.mROH adduct, wherein 0.5<m<6.0 and R is an alkyl, cycloalkyl or aryl radical comprising 1-12 carbon atoms, a liquid phase comprising at least one compound capable of reacting with the —OH group(s) of said adduct to obtain a slurry comprising a MgCl$_2$.nROH adduct, wherein n is lower than m;
   continuously withdrawing a liquid stream from the liquid phase to keep constant the level of the liquid phase in the vessel; and
   reacting the slurry comprising the MgCl$_2$.nROH adduct with at least one titanium compound of formula Ti(OR°)$_p$X$_{q-p}$, wherein q=3-4; p=0-q; X is a halogen; and R° is an alkyl, cycloalkyl, or aryl radical comprising 1-18 carbon atoms.

2. The process according to claim 1, wherein the solid particles of said MgCl$_2$.mROH adduct comprise an average diameter from 1.0 to 150 μm.

3. The process according to claim 2, wherein said average diameter is from 1.0 to 40 μm.

4. The process according to claim 1, wherein said compound capable of reacting with the —OH group(s) is selected from halogenated silicon compounds, halogenated Sn-compounds, titanium compounds comprising at least one Ti-halogen bond, aluminum-alkyl compounds, and mixtures thereof.

5. The process according to claim 4, wherein said compound capable of reacting with the —OH group(s) is aluminum-trialkyl compounds.

6. The process according to claim 1, wherein the solid particles of said MgCl$_2$.mROH adduct is continuously contacted with the liquid phase at a temperature ranging from −10° C. to 150° C.

7. The process according to claim 1, wherein the solid particles of said $MgCl_2 \cdot mROH$ adduct is continuously contacted with the liquid phase, and the liquid phase in the vessel comprises an average residence time of below 90 minutes.

8. The process according to claim 7, wherein the average residence time is below 30 minutes.

9. The process according to claim 1, wherein the solid particles of said $MgCl_2 \cdot mROH$ adduct is continuously contacted with the liquid phase at a concentration ranging from 100 to 400 g/l.

10. The process according to claim 9, wherein said concentration ranges from 150 to 300 g/l.

11. The process according to claim 1, wherein said slurry comprising the $MgCl_2 \cdot nROH$ adduct and said liquid stream are continuously separated by means of filtering units placed inside the vessel.

12. The process according to claim 11, wherein said liquid stream is continuously withdrawn from said vessel via an outlet placed downstream from said filtering units.

13. The process according to claim 11, wherein said slurry comprising the $MgCl_2 \cdot nROH$ adduct is discharged from said vessel via an outlet placed upstream from said filtering units.

14. The process according to claim 1, wherein n is from 0.1 and 3.0.

15. The process according to claim 1, wherein the slurry comprising the $MgCl_2 \cdot nROH$ adduct is reacted with the at least one titanium compound in a second vessel placed downstream from the vessel containing the liquid phase and solid particles of the $MgCl_2 \cdot mROH$ adduct.

16. The process according to claim 1, wherein the process is carried out in a single vessel.

17. The process according to claim 1, further comprising at least one compound of formula $Si(OR')_p X_{4-p}$, wherein $p=0-4$; X is an halogen; and R' is an alkyl, cycloalkyl, or aryl radical comprising 1-18 carbon atoms, in an admixture with said at least one titanium compound.

18. The process according to claim 1, wherein the slurry comprising the $MgCl_2 \cdot nROH$ adduct is reacted with the at least one titanium compound at a temperature ranging from 50° C. to 150° C.

19. The process according to claim 18, wherein solid particles formed from the reaction of the slurry comprising the $MgCl_2 \cdot nROH$ adduct and the at least one titanium compound are separated from a liquid phase by means of filtration or centrifugation.

20. The process according to claim 1, wherein the process is carried out in at least one vessel comprising one or more filtering units, the filtering units comprising openings between 1 and 200 μm with a differential pressure applied on the filtering units ranging from 50 to 1000 Kpa.

21. The process according to claim 20, wherein the one or more filtering units are Nutsche filters or centrifugal-discharge filters.

22. The process according to claim 1, wherein the $MgCl_2 \cdot mROH$ adduct is a $MgCl_2$/ethanol adduct comprising from 2 to 4 moles of ethanol.

23. The process according to claim 1, wherein the titanium compound is $TiCl_4$, a tetra-alkoxytitanium compound, or mixtures thereof.

24. A process for polymerizing at least one α-olefin of formula $CH_2=CHR''$, wherein R'' is hydrogen, alkyl, cycloalkyl, aryl, arylalkyl, or alkylaryl radical comprising 1 to 12 carbon atoms; said process being carried out in presence of a catalyst system comprising a solid catalyst component comprising an average diameter from 1.0 to 150 μm obtained by a process comprising:

continuously feeding to a vessel containing solid particles of a $MgCl_2 \cdot mROH$ adduct, wherein $0.5<m<6.0$ and R is an alkyl, cycloalkyl or aryl radical comprising 1-12 carbon atoms, a liquid phase comprising at least one compound capable of reacting with the —OH group(s) of said adduct to obtain a slurry comprising a $MgCl_2 \cdot nROH$ adduct, wherein n is lower than m;

continuously withdrawing a liquid stream from the liquid phase to keep constant the level of the liquid phase in the vessel; and reacting the slurry comprising the $MgCl_2 \cdot nROH$ adduct with at least one titanium compound of formula $Ti(OR^\circ)_p X_{q-p}$, wherein $q=3-4$; $p=0-q$; X is a halogen; and $R^\circ$ is an alkyl, cycloalkyl, or aryl radical comprising 1-18 carbon atoms.

* * * * *